United States Patent
Faruque et al.

(10) Patent No.: US 12,115,924 B1
(45) Date of Patent: Oct. 15, 2024

(54) AIRBAG ASSEMBLY FOR CHILD-RESTRAINT SYSTEM

(71) Applicant: Ford Global Technologies, LLC, Dearborn, MI (US)

(72) Inventors: Mohammad Omar Faruque, Ann Arbor, MI (US); S.M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/324,369

(22) Filed: May 26, 2023

(51) Int. Cl.
*B60R 21/015* (2006.01)
*B60R 21/01* (2006.01)
(Continued)

(52) U.S. Cl.
CPC ...... *B60R 21/01556* (2014.10); *B60R 21/207* (2013.01); *B60R 21/233* (2013.01);
(Continued)

(58) Field of Classification Search
CPC ........... B60R 21/01556; B60R 21/207; B60R 21/233; B60R 21/23138; B60R 2021/006; B60R 2021/01286; B60R 2021/23107; B60R 2021/23146; B60R 2021/23509; B60R 21/23184; B60R 21/232;
(Continued)

(56) References Cited

U.S. PATENT DOCUMENTS 4,904,021 A * 2/1990 Clemmer ............... A47C 7/383
297/399
5,499,840 A * 3/1996 Nakano ............... B60N 2/0705
280/730.2
(Continued)

FOREIGN PATENT DOCUMENTS

DE 102012006772 A1 * 10/2012 .......... C08L 23/0815
DE 102021100015 A1 * 7/2021 ............ B60N 2/427
(Continued)

OTHER PUBLICATIONS

Ohtani, 2012, Machine Translation of Specification of DE-102012006772-A1.*
(Continued)

*Primary Examiner* — Amy R Weisberg
*Assistant Examiner* — Matthew Joseph Ganci
(74) *Attorney, Agent, or Firm* — Frank A. MacKenzie; Bejin Bieneman PLC (57) ABSTRACT

A vehicle seat has a seatback and a seat bottom defining an occupant-seating area. An inflatable device is fixed to the seatback and is inflatable from the seatback vehicle-forward along the occupant-seating area from an uninflated position to an inflated position. The inflatable device has an inflation chamber. The inflatable device is a thermoplastic elastomer. The vehicle includes a computer including a processor and a memory storing instructions executable by the processor to: detect a removeable child-restraint system on the occupant-seating area; and based on the detection of the removeable child-restraint system on the occupant-seating area,
(Continued)

inflate the inflatable device in response to detection of certain vehicle impacts.

14 Claims, 10 Drawing Sheets

(51) Int. Cl.
    *B60R 21/207*     (2006.01)
    *B60R 21/231*     (2011.01)
    *B60R 21/233*     (2006.01)
    *B60R 21/235*     (2006.01)
    *B60R 21/00*     (2006.01)

(52) U.S. Cl.
    CPC ............ *B60R 2021/006* (2013.01); *B60R 2021/01286* (2013.01); *B60R 2021/23107* (2013.01); *B60R 21/23138* (2013.01); *B60R 2021/23146* (2013.01); *B60R 2021/23509* (2013.01)

(58) Field of Classification Search
    CPC ............ B60R 21/01; B60R 2021/2078; B60R 2021/23153; B60R 2021/23161
    See application file for complete search history.

(56) References Cited

U.S. PATENT DOCUMENTS

| | | | |
|---|---|---|---|
| 6,827,400 | B2 | 12/2004 | Menon et al. |
| 9,994,138 | B2 | 6/2018 | Whitens et al. |
| 11,529,925 | B2 * | 12/2022 | Jost ................... B60R 21/23138 |
| 11,541,836 | B1 * | 1/2023 | Farooq .............. B60R 21/23138 |
| 11,713,014 | B1 * | 8/2023 | Faruque ............ B60R 21/23138 |
| | | | 280/728.1 |

FOREIGN PATENT DOCUMENTS

| | | | | |
|---|---|---|---|---|
| KR | 20020055673 | A * | 12/2000 | |
| KR | 101694716 | B1 | 1/2017 | |
| KR | 20170004119 | A | 1/2017 | |
| WO | WO-9730864 | A1 * | 8/1997 | ............. B60N 2/002 |

OTHER PUBLICATIONS

Hatta, 2021, Machine Translation of Specification of DE-102021100015-A1.*
Farooq, DE 102015112000 A1, Machine Translation of Specification (Year: 2016).*
Seong, KR 20020055673 A, Machine Translation of Specification (Year: 2000).*

* cited by examiner

AIRBAG ASSEMBLY FOR CHILD-RESTRAINT SYSTEM

BACKGROUND

Vehicles are typically equipped with airbags. In the event of certain impacts, inflators activate and provide inflation medium to the airbags, and the airbags pressurize and act as supplemental restraints for occupants during the impact. The airbags are located at various fixed positions in passenger cabins of vehicles. As examples, vehicles may include a driver airbag mounted in the steering wheel, a passenger airbag mounted in the top of a dash in a vehicle-forward direction from the front passenger seat, and side curtain airbags mounted in the roof rails above the doors.

Child-restraint systems (CRS) are removable seats for seating and restraining children riding in a vehicle. Types of CRSs include rearward facing child seats, forward-facing child seats, combination seats that can face rearward or forward, and booster seats. Rearward facing, forward facing, and combination child seats include a harness for restraining the child occupant. Booster seats rely on the seatbelts included with the vehicle. CRSs may be held in place by the seatbelt of the vehicle and/or may include tethers for attaching to tether attachment brackets of the vehicle.

Vehicles are equipped with anchors for anchoring the CRS to the vehicle. Specifically, the anchor may provide for anchoring of the CRS to a vehicle seat and/or to a body of the vehicle. CRSs include anchoring for connecting the anchor of the vehicle. The anchor of the vehicle and the anchoring system of the CRS may be configured to comply with a standard, e.g., ISOFIX (e.g., ISO216), which is an international standard for attachment points for child safety seats in passenger cars; LATCH ("Lower Anchors and Tethers for Children") in the United States; LUAS ("Lower Universal Anchorage System"); Canfix in Canada; UCSSS ("Universal Child Safety Seat System").

DETAILED DESCRIPTION

A vehicle includes a vehicle seat having a seatback and a seat bottom defining an occupant-seating area. An inflatable device is fixed to the seatback and is inflatable from the seatback vehicle-forward along the occupant-seating area from an uninflated position to an inflated position. The inflatable device has an inflation chamber. The inflatable device is a thermoplastic elastomer. The vehicle includes a computer including a processor and a memory storing instructions executable by the processor to: detect a removeable child-restraint system on the occupant-seating area; and based on the detection of the removeable child-restraint system on the occupant-seating area, inflate the inflatable device in response to detection of certain vehicle impacts.

The vehicle may include a second inflatable device fixed to the seatback and inflatable vehicle-forward along the occupant-seating area from an uninflated position to an inflated position. The second inflatable device has an inflation chamber. The second inflatable device is a thermoplastic elastomer. The second inflatable device is spaced from the inflatable device. The occupant-seating area is between the inflatable device and the second inflatable device in the inflated positions. The memory storing instructions executable by the processor to: based on detection of the removeable child-restraint system on the occupant-seating area, inflate both the inflatable device and the second inflatable device in response to detection of certain vehicle impacts.

The vehicle seat may define a second occupant-seating area. The vehicle may include a third inflatable device fixed to the seatback and inflatable vehicle-forward along the second occupant-seating area from an uninflated position to an inflated position. The third inflatable device has an inflation chamber. The third inflatable device is a thermoplastic elastomer. The third inflatable device is spaced from the second inflatable device. The second occupant-seating area is between the second inflatable device and the third inflatable device. The memory stores instructions executable by the processor to: based on the detection of the removeable child-restraint system on the second occupant-seating area, inflate the second inflatable device and the third inflatable device in response to detection of certain vehicle impacts.

The vehicle seat may define a third occupant-seating area. The vehicle may include a fourth inflatable device fixed to the seatback and inflatable vehicle-forward along the third occupant-seating area from an uninflated position to an inflated position. The fourth inflatable device has an inflation chamber. The fourth inflatable device is a thermoplastic elastomer. The fourth inflatable device is spaced from the third inflatable device. The third occupant-seating area is between the third inflatable device and the fourth inflatable device. The memory stores instructions executable by the processor to: based on the detection of the removeable child-restraint system on the third occupant-seating area, inflate the third inflatable device and the fourth inflatable device in response to detection of certain vehicle impacts.

The memory may store instructions executable by the processor to maintain the inflatable device in an uninflated position based on detection of an adult occupant in the occupant-seating area.

The vehicle may include an airbag supported on the inflatable device and inflating from the uninflated position to the with the inflatable device. The airbag may be moveable with the inflatable device as the inflatable device inflates from the uninflated position to the inflated position. The airbag may extend from the inflatable device toward the occupant-seating area in the inflated position. The airbag may include an inflation chamber open to the inflation chamber of the inflatable device. The airbag may be spaced from the seatback in the inflated position. The inflatable device may abut the seat bottom in the inflated position and the airbag may be spaced from the seat bottom in the inflated position. The airbag may be woven fabric.

The vehicle may include an inflator in fluid communication with the inflatable device.

The inflatable device may abut the seat bottom in the inflated position.

The seatback may have a seatback frame and a covering on the seatback frame. The inflatable device may be between the seatback frame and the covering in the uninflated position and extend through the covering in the inflated position.

With reference to the Figures, wherein like numerals indicate like parts throughout the several views, a vehicle 10 is generally shown. The vehicle seat 12 has a seatback 14 and a seat bottom 16 defining an occupant-seating area 18. An inflatable device 48 is fixed to the seatback 14 and is inflatable from the seatback 14 vehicle-forward along the occupant-seating area 18 from an uninflated position to an inflated position. The inflatable device 48 has an inflation chamber 26. The inflatable device 48 is a thermoplastic elastomer. The vehicle 10 includes a computer 28 including a processor and a memory storing instructions executable by the processor to: detect a removeable child-restraint system (CRS 30) on the occupant-seating area 18; and based on the detection of the removeable CRS 30 on the occupant-seating area 18, inflate the inflatable device 48 in response to detection of certain vehicle impacts.

In the event of detection of certain vehicle impacts and detection of the presence of a removable CRS 30 on the occupant-seating area 18, the inflatable device 48 is inflated from an uninflated position to an inflated position, as described further below. When the inflatable device 48 is in the inflated position, the inflatable device 48 controls the kinematics of the removable CRS 30 and/or an occupant of the CRS 30.

In the example shown in the Figures, the vehicle seat 12 includes three occupant-seating areas, namely a first occupant-seating area 18, 20, a second occupant-seating area 18, 22, and a third occupant-seating area 18, 24. The vehicle 10 in the example shown in the Figures includes four inflatable assemblies, namely a first inflatable assembly 58, 60, a second inflatable assembly 58, 62, a third inflatable assembly 58, 64, and a fourth inflatable assembly 58, 66. As described further below, each inflatable assembly 58 includes an instance of the inflatable device 48 (namely a first inflatable device 48, 50, a second inflatable device 48, 52, a third inflatable device 48, 54, and a fourth inflatable device 48, 56). The inflatable assemblies 58 are independently deployable, as described further below, based on occupancy of the vehicle seat 12 by a CRS 30. The numerical adjectives first, second, third, fourth, etc., are used herein merely as identifiers and do not indicate order or importance. Common numerals are used to identify common features among the various inflatable assemblies 58.

Figure 1:
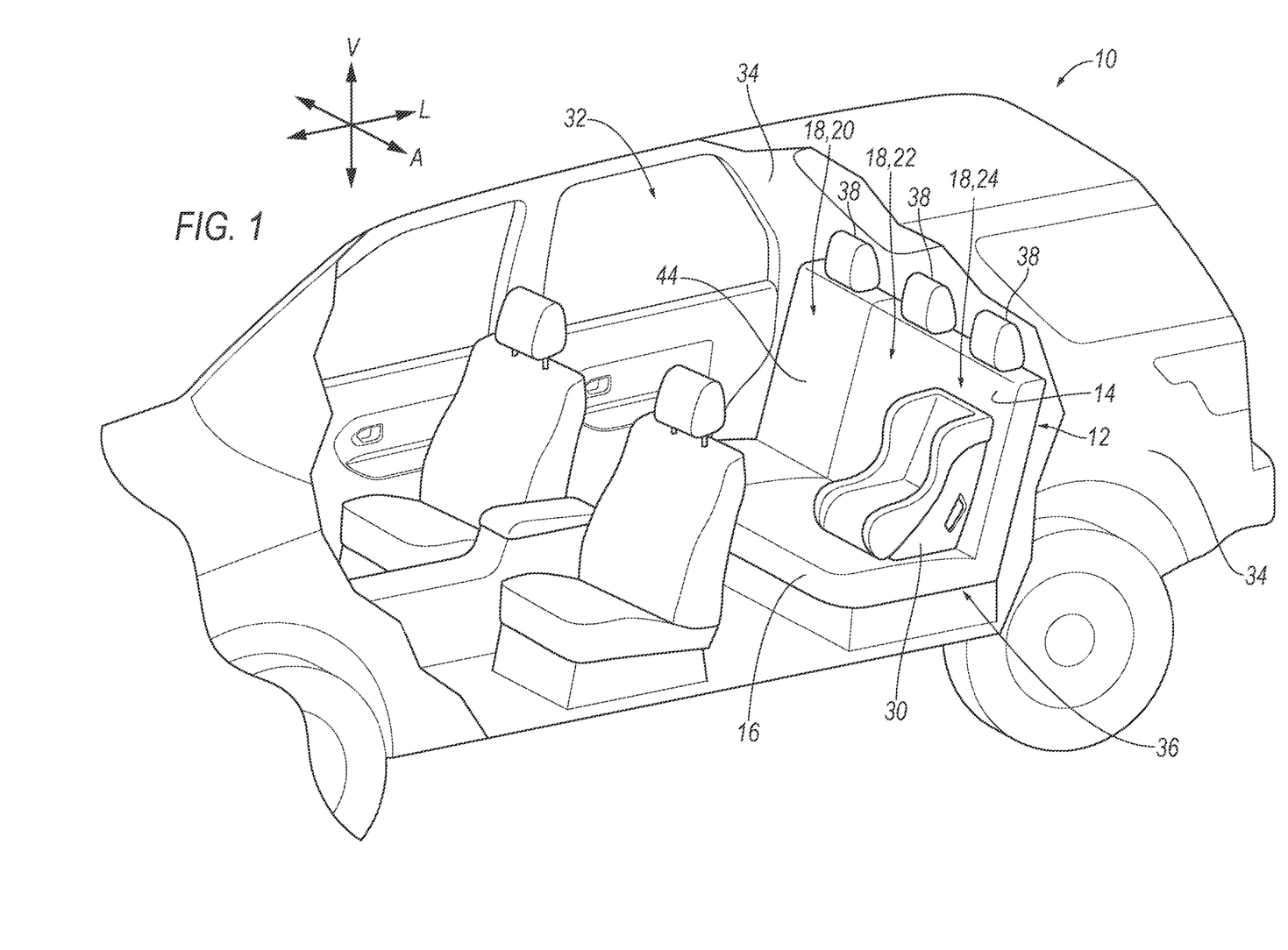
FIG. 1 is a perspective view of a vehicle including a seat and a removable child-restraint system (CRS) installed on the seat.

With reference to FIG. 1, the vehicle 10 may be any type of passenger or commercial automobile such as a car, a truck, a sport utility vehicle, a crossover, a van, a minivan, a taxi, a bus, etc. Operations, systems, and methods described herein should always be implemented and/or performed in accordance with an applicable owner's/user's manual and/or safety guidelines.

With reference to FIG. 1, the vehicle 10 defines a vehicle-longitudinal axis L extending between a front end (not numbered) and a rear-end (not numbered) of the vehicle 10. The vehicle 10 defines a vehicle-lateral axis A extending cross-vehicle from one side to the other side of the vehicle 10. The vehicle 10 defines a vertical axis V. The vehicle-longitudinal axis L, the vehicle-lateral axis A, and the vertical axis V are perpendicular relative to each other.

The vehicle 10 includes a vehicle body (not numbered) defining a passenger cabin 32 to house occupants of the vehicle 10. The vehicle body may include a vehicle roof (not numbered) and a vehicle floor (not numbered) with the vehicle roof defining an upper boundary of the passenger cabin 32 and the vehicle floor defining a lower boundary of the passenger cabin 32. The vehicle body includes vehicle doors (not numbered) openable to allow ingress to and egress from the passenger cabin 32. The passenger cabin 32 may extend across the vehicle 10, i.e., from one side to the other side of the vehicle 10. The passenger cabin 32 includes a front end (not numbered) and a rear end (not numbered) with the front end being in front of the rear end along the longitudinal axis L during forward movement of the vehicle 10.

The vehicle body includes a body side 34. Specifically, the vehicle body includes two body sides 34 spaced cross vehicle 10 from each other. The body side 34 is a side of the vehicle body located vehicle-outboard of the passenger cabin 32. The body sides 34 may be spaced cross-vehicle from each other along the vehicle-lateral axis A and may be elongated along the longitudinal axis L. The body side 34 includes one or more door openings (not numbered). The vehicle floor extends from one body side 34 to the other body side 34 and the vehicle roof extends from one body side 34 to the other body side 34. The vehicle body, specifically each body side 34, may include pillars. In some examples, the pillars on the same body side 34 are separated by one of the door openings. The vehicle 10 may include any suitable number of pillars on either body side 34. The pillars may extend from the roof to the vehicle floor.

With reference to FIG. 1, the vehicle 10 includes vehicle doors openable for occupants to enter and exit the passenger cabin 32, as described above. In the example shown in the Figures, the vehicle 10 includes a front door and a rear door on each body side 34. The front door is vehicle-forward of the rear door, along the longitudinal axis L of the vehicle 10.

The vehicle 10 includes one or more vehicle seats 12. Specifically, the vehicle 10 may include any suitable number of vehicle seats 12. The vehicle seats 12 are supported by the vehicle floor. The vehicle seats 12 may be arranged in any suitable arrangement in the passenger cabin 32. One or more of the vehicle seats 12 may be at the front end of the passenger cabin 32, e.g., in a front row. One or more of the vehicle seats 12 may be behind the front end of the passenger cabin 32, e.g., at the rear end of the passenger cabin 32 as a rear row 36. In the example shown in the Figures, the vehicle 10 includes the vehicle seat 12 arranged as a rear row 36. Specifically, the vehicle seat 12 of the rear row 36 includes three occupant-seating areas 18. In other examples, the seat of the rear row 36 may include any suitable number of occupant-seating areas 18. The rear row 36 may be, in some examples, a second row or a third row. The vehicle seats 12 may be of any suitable type, e.g., a bucket seat, bench seat, etc.

Each of the vehicle seats 12 include the seatback 14 and the seat bottom 16. The vehicle seat 12 may include a head restraint 38. The head restraint 38 may be supported by and extend upwardly from the seatback 14. The head restraint 38 may be stationary or movable relative to the seatback 14. The seatback 14 may be supported by the seat bottom 16 and may be stationary or movable relative to the seat bottom 16. The seatback 14 may extend from an upper end to a lower end. The lower end may be connected to the seat bottom 16. The upper end of the seatback 14 may be spaced upwardly from the lower end of the seatback 14, i.e., upwardly from the seat bottom 16. The head restraint 38 may extend upwardly from the upper end of the seatback 14. The seatback 14, the seat bottom 16, and the head restraint 38 may be adjustable in multiple degrees of freedom.

With continued reference to FIG. 1, each vehicle seat 12 defines a seat-forward direction D1 along a seat-forward axis A1. The seat-forward direction D1 extends forward relative to the vehicle seat 12. For example, the seat-forward direction D1 may extend from a rear of the vehicle seat 12 to a front of the vehicle seat 12 relative to an occupant of the vehicle seat 12, i.e., the occupant of the vehicle seat 12 faces in the seat-forward direction D1. In other words, the seat bottom 16 extends from the seatback 14 in the seat-forward direction D1. The vehicle seat 12 defines a cross-seat axis A2 and a seat-upright axis A3. The seat-forward axis A1, the cross-seat axis A2, and the seat-upright axis A3 are perpendicular to each other. In the example shown in the Figures, the seat of the rear row 36 includes three occupant-seating areas 18 positioned along the cross-seat axis A2.

Figure 2:
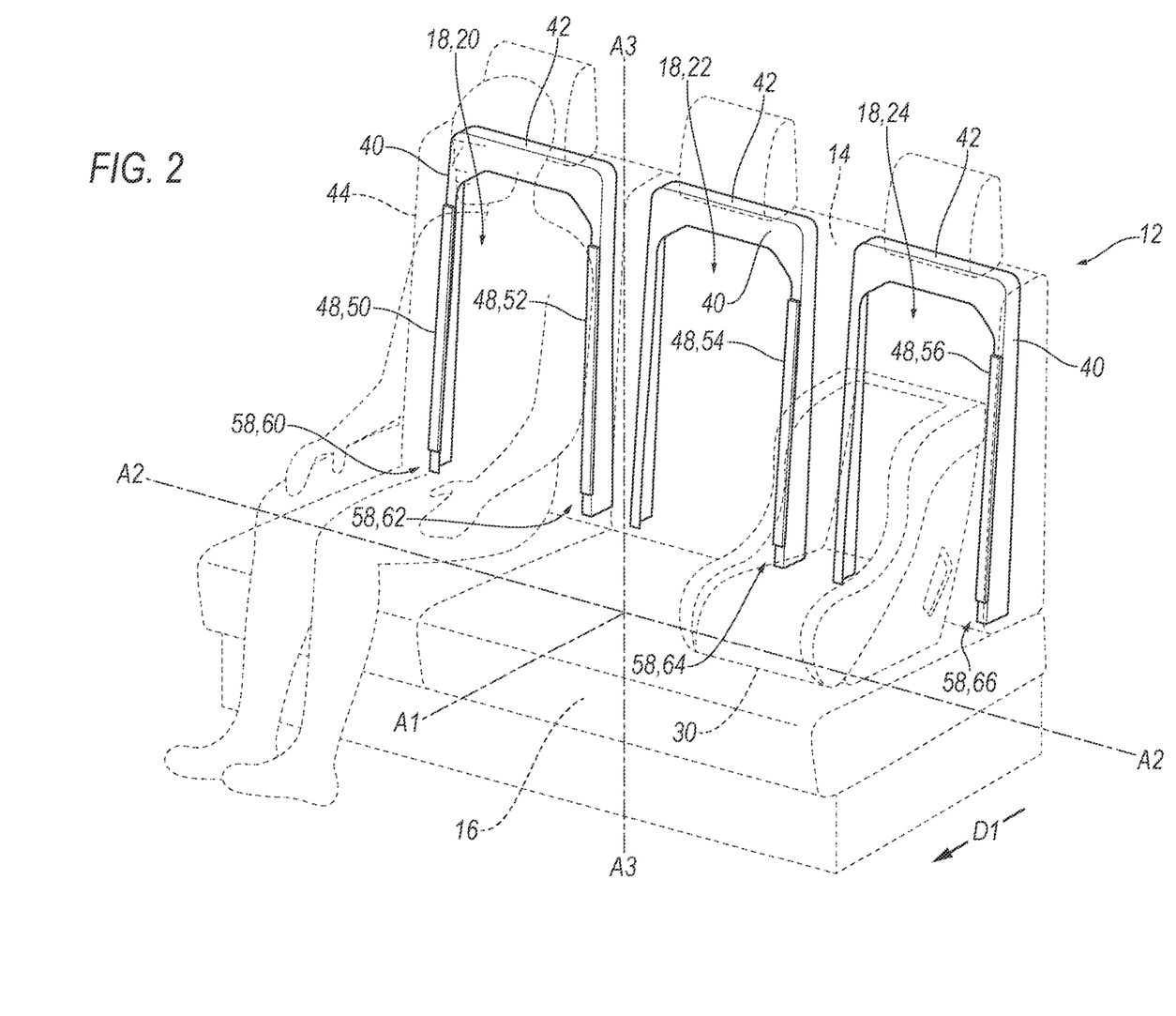
FIG. 2 is a perspective view of the seat with an occupant seated directly on the seat and with a CRS installed on the seat with four inflatable devices each in an uninflated position.
Figure 5:
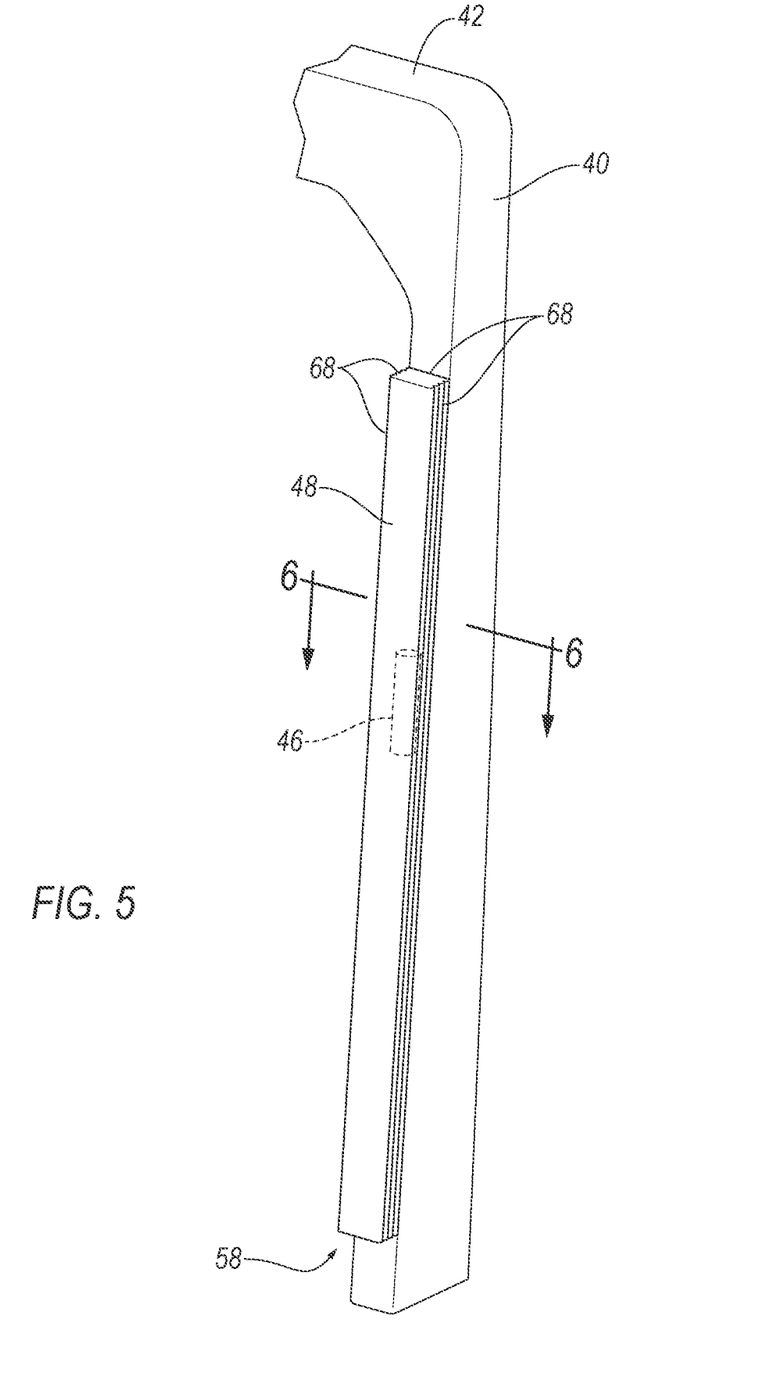
FIG. 5 a perspective view of a portion of the seat with one instance of the inflatable device in the uninflated position.

With reference to FIG. 2, the vehicle seat 12 includes a seat frame 40 (FIGS. 2 and 5). The seat frame 40 includes a seatback frame 42 and the seat bottom 16 includes a seat bottom frame (not shown), i.e., the seatback 14 includes the seatback frame 42 and the seat bottom 16 includes the seat bottom frame. The seat frame 40 may include panels and/or may include tubes, beams, etc. The seat frame 40 may be of any suitable plastic material (e.g., carbon fiber reinforced plastic (CFRP), glass fiber-reinforced semi-finished thermoplastic composite (organosheet), etc.), a suitable metal (e.g., steel, aluminum, etc.), etc. The seatback frame 42 has a U-shaped cross-section in the example shown in FIGS. 6A-B and 8. In other examples, the seatback frame 42 may have any suitable size and shape.

The vehicle seat 12 includes a covering 44 supported on the seat frame 40. The covering 44 may be cloth, leather, faux leather, or any other suitable material. The vehicle seat 12 may include padding material between the covering 44 and the seat frame 40. The padding material may be foam or any other suitable material. The covering 44 may be stitched in panels around the seat frame 40 and padding material. The covering 44 may include a tear seam (not numbered) associated with each inflatable device 48. The inflatable device 48 may extend through the tear seam as the inflatable device 48 moves from the uninflated position to the inflated position. The tear seam may be designed to tear apart when subjected to a tensile force above a threshold magnitude. In other words, the covering 44 on one side of the tear seam separates from the covering 44 on the other side of the tear seam when the force is above the threshold magnitude. The threshold magnitude may be chosen to be greater than forces from, e.g., inadvertent pushing against the seat by an occupant but be less than forces from the deployment of the airbag 74. The tear seam may be, for example, a line of perforations through the covering 44, a line of thinner covering 44 material than the rest of the covering 44, etc.

The seatback 14 may define at least one occupant-seating area 18. The occupant-seating area 18 is the space occupied by an occupant properly seated on the vehicle seat 12. The occupant-seating area 18 is seat-forward of the seatback 14 and above the seat bottom 16. As set forth above, in the example shown in the Figures, the vehicle seat 12 includes the first occupant-seating area 18, 20, the second occupant-seating area 18, 22, and the third occupant-seating area 18, 24. The three occupant-seating areas 18 are positioned adjacent each other along the cross-seat axis A2. Each occupant-seating area 18 is designed to directly support an occupant and to alternatively support a CRS 30. For example, in the example shown in FIGS. 2-3, the first occupant-seating area 18, 20 supports an adult occupant and the third occupant-seating area 18, 24 supports a CRS 30. As another example, in the example in FIG. 4, the first occupant-seating area 18, 20 supports a CRS 30 and the third occupant-seating area 18, 24 supports another CRS 30.

CRSs 30 are designed to control kinematics of a child, e.g., a human having a certain, age, height, weight, etc., during certain vehicle impacts. The CRS 30 is configured for installation in the vehicle 10. When installed in the vehicle 10, the CRS 30 is supported by the vehicle seat 12. For example, the CRS 30 may sit atop the seat bottom 16 and abut the seatback 14. As shown in the example in the Figures, the CRS 30 may be installed in a forward-facing orientation, i.e., in which the occupant of the CRS 30 faces a front of the vehicle 10. In other examples, the CRS 30 may be installed in a rearward-facing orientation, i.e., in which the occupant of the CRS 30 faces a rear of the vehicle 10.

A CRS 30 is designed to receive a child. The CRS 30 may include a seating portion having a bottom and a back, e.g., for a child to sit on and recline against. The CRS 30 may include a base supporting the seating portion. The base may be below the bottom and/or behind the back of the CRS 30. The bottom and/or back may pivot relative to the base, e.g., to change an angle of the bottom and/or back of the CRS 30 relative to the vehicle seat 12 supporting the CRS 30. The bottom and/or the back may be upholstered, padded, etc. The base may be rigid relative to the bottom and/or the back. For example, the base may be of rigid material including material types such as plastic, metal, etc.

The CRS 30 may be configured to comply with a standard. As an example, the CRS 30 may be configured to comply with ISOFIX (e.g., ISO216), which is an international standard for attachment points for CRSs 30 in passenger cars. In addition or as other examples, the CRS 30 may be configured to comply with LATCH ("Lower anchors and Tethers for Children") in the United States, LUAS ("Lower Universal Anchorage System") or Canfix in Canada, and/or UCSSS ("Universal Child Safety Seat System").

The CRS 30 is removeable from the vehicle seat 12. In other words, the CRS 30 may be installed to the vehicle seat 12 at one of the occupant-seat areas 18 for use by an occupant of the CRS 30 and may be uninstalled from the seat so that the occupant-seating area 18 is open for use by another occupant, e.g., an adult occupant as shown in the examples in FIGS. 2 and 3. The vehicle 10 and/or the vehicle seat 12 is designed to connect to the CRS 30 to install the CRS 30 to the vehicle seat 12. As an example, the vehicle 10 includes an anchor that is designed to be connected to a CRS 30 when the CRS 30 is installed in the vehicle 10. Specifically, the CRS 30 includes a connection point that is connectable to the anchor to install the CRS 30. The connection point may be a clip, e.g., a clip with an open loop and flexible gate, an "alligator" style clip defining a slot with a button actuated latch, or any other suitable configuration for connecting to the respective anchor, including in some examples that are currently known. The connection point may be configured for attachment to the anchor that meets a standard, e.g., ISOFIX, LATCH, LUAS, UCSSS, etc. For example, a CRS 30 can have a strap and a clip that is connectable to the anchor. The CRS 30 may include further attachment points that connect to other features of the vehicle 10, e.g., other portions of the seat or vehicle body such as anchors meeting a standard, ISOFIX, LATCH, LUAS, UCSSS, etc., including in some examples those that are currently known.

The vehicle 10 includes at least one inflatable assembly 58. As set forth above, in the example shown in the Figures, the vehicle 10 includes the first inflatable assembly 58, 60, the second inflatable assembly 58, 62, the third inflatable assembly 58, 64, and the fourth inflatable assembly 58, 66. In other examples, the vehicle 10 may include any suitable number of inflatable assemblies, i.e., one or more. Common numerals are used to identify common features among the various inflatable assemblies. Each inflatable assembly 58 includes one inflatable device 48. For example, the first inflatable assembly 58, 60 includes the first inflatable device 48, 50, the second inflatable assembly 58, 62 includes the second inflatable device 48, 52, the third inflatable assembly 58, 64 includes the third inflatable device 48, 54, and the fourth inflatable assembly 58, 66 includes the fourth inflatable device 48, 56. Common numerals are used to identify common features among the various inflatable assemblies.

The vehicle 10 includes at least one inflator 46. In the example shown in the Figures, each inflatable assembly 58 includes one dedicated inflator 46. In other examples, two or more inflatable assemblies 58 may share a common inflator 46. In such examples, fill tubes, valves, etc., deliver, distribute, and/or control the selective flow of inflation medium from the inflator 46 to the associated inflatable assemblies 58.

Figure 3:
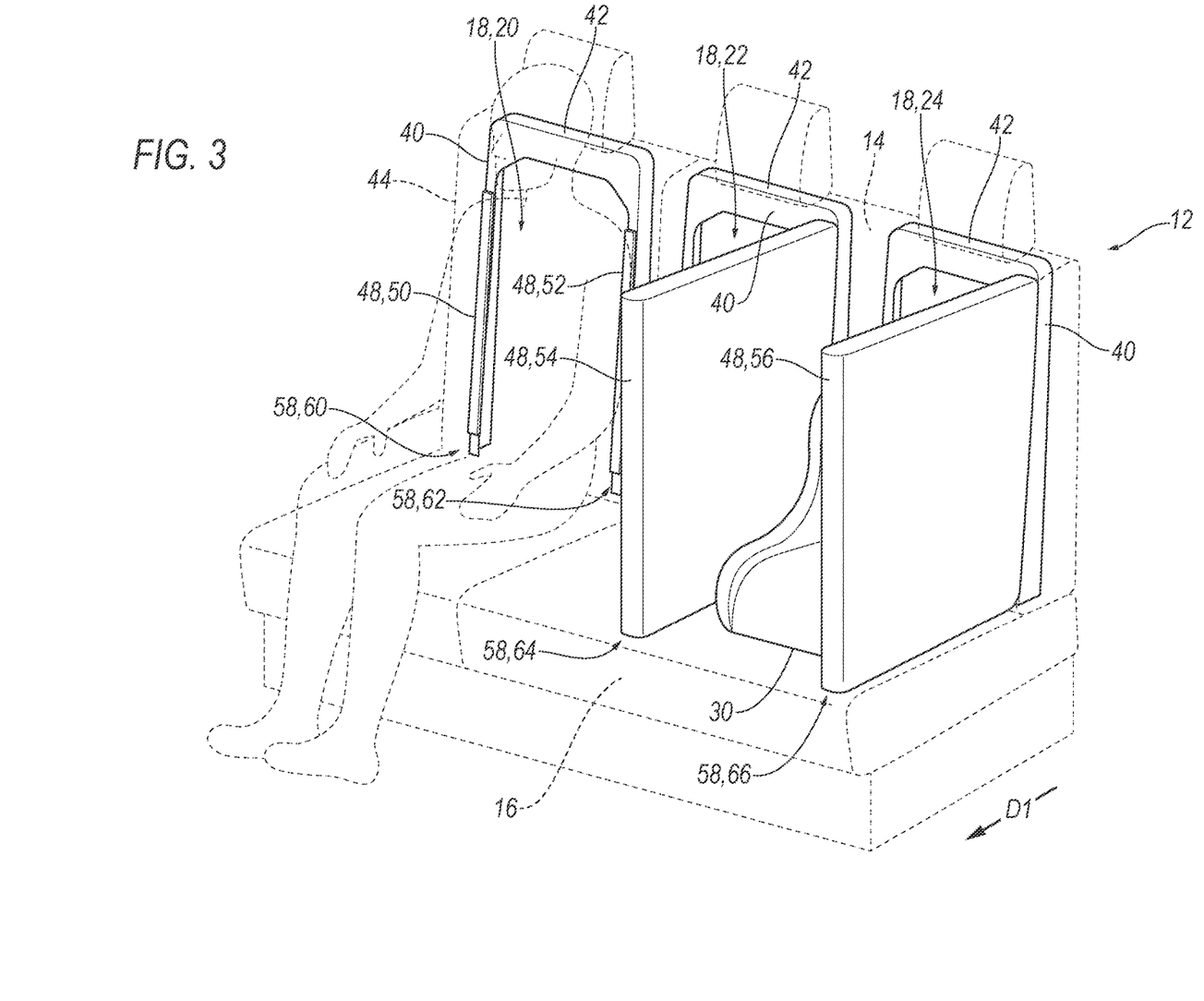
FIG. 3 a perspective view of the seat with an occupant seated directly on the seat and with a CRS installed on the seat with two of the inflatable devices in a inflated position.
Figure 4:
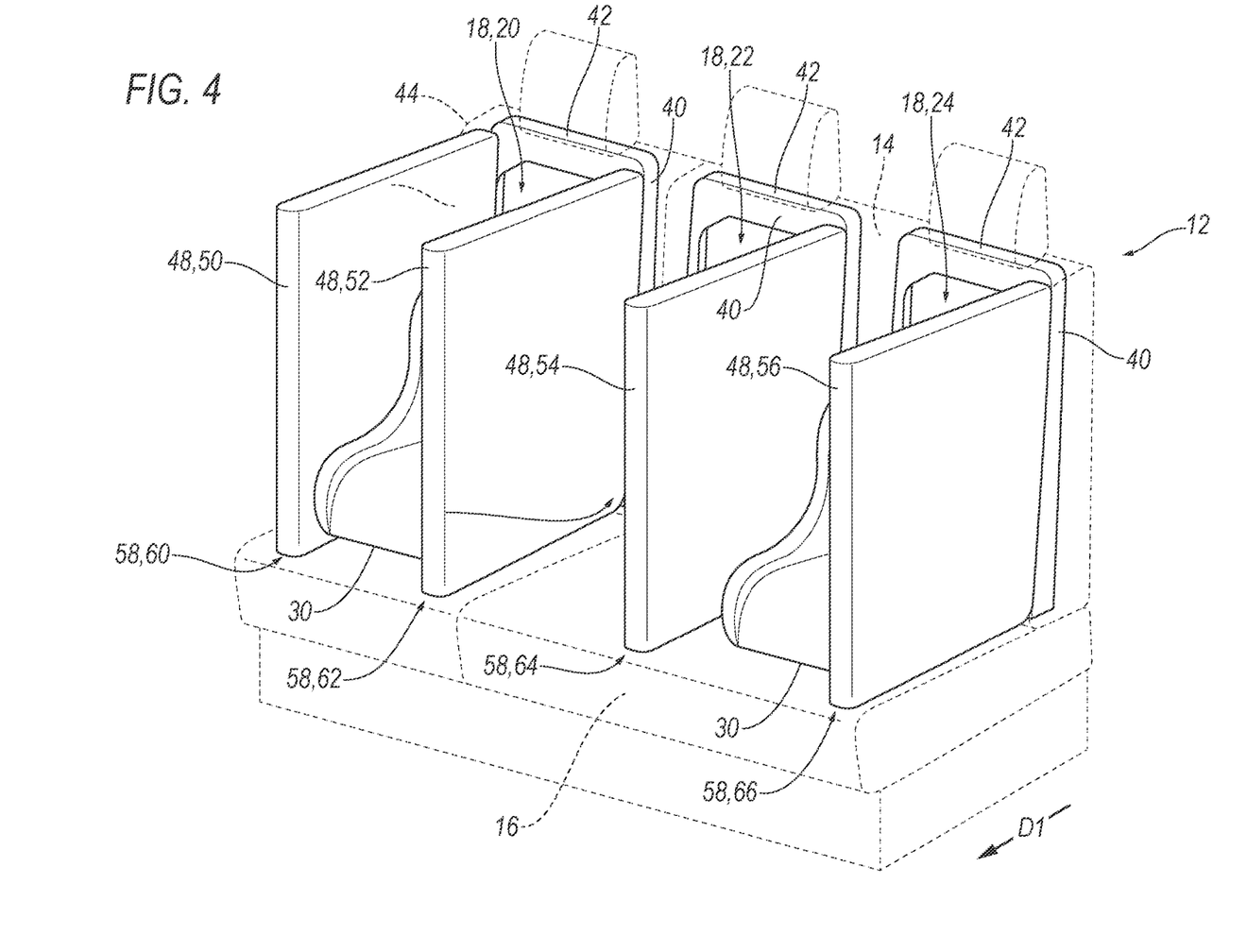
FIG. 4 a perspective view of the seat with two CRSs installed on the seat with four inflatable devices each in the uninflated position.

The inflator 46 inflates the respective inflatable device 48 to deploy the inflatable device 48 from the uninflated position to the inflated position. As an example, the four inflatable devices 48 are in the uninflated position in FIG. 2. In FIG. 3, the first inflatable device 48, 50 and the second inflatable device 48, 52 are in the uninflated position and the third inflatable device 48, 54 and the fourth inflatable device 48, 56 are in the inflated position. In the examples shown in FIG. 4, all four inflatable devices 48 are in the inflated position. The inflatable devices 48 are selectively inflated from the uninflated position to the inflated position, as described further below.

With reference to FIG. 2, the four inflatable devices 48 are spaced from each other along the vehicle-lateral axis A. In the example shown in the Figures, the first inflatable device 48, 50 is at one of the body sides 34 and the fourth inflatable device 48, 56 is at the other of the body sides 34. The second inflatable device 48, 52 is spaced from the first inflatable device 48, 50 with the first occupant-seating area 18, 20 therebetween. The third inflatable device 48, 54 is spaced from the second inflatable device 48, 52 with the second occupant-seating area 18, 22 therebetween. The fourth inflatable device 48, 56 is spaced from the third inflatable device 48, 54 with the third occupant-seating area 18, 24 therebetween. When the respective inflatable devices 48 are in the inflated position, the first occupant-seating area 18, 20, is between the first inflatable device 48, 50 and the second inflatable device 48, 52; the second occupant-seating area 18, 22 is between the second inflatable device 48, 52 and the third inflatable device 48, 54; and the third occupant-seating area 18, 24 is between the third inflatable device 48, 54 and the fourth inflatable device 48, 56.

Each inflatable device 48 is a thermoplastic elastomer (TPE). The thermoplastic elastomer has both thermoplastic and elastomeric properties. The thermoplastic elastomer of the inflatable device 48 has properties that allow the inflatable device 48 to control the kinematics of an occupant. The inflatable device 48 being a thermoplastic elastomer aids in the deployment characteristics and the shape and size of the inflatable devices 48 in the inflated position. The thermoplastic elastomer may aid in packaging of the inflatable device 48. As described further below, the properties of the thermoplastic elastomeric of the inflatable device 48 allow the inflatable device 48 to be packaged on the seatback frame 42 and provide control of the shape, size, and dimensions during inflation to position the inflatable device 48 to control the kinematics of an occupant.

Figure 6A:
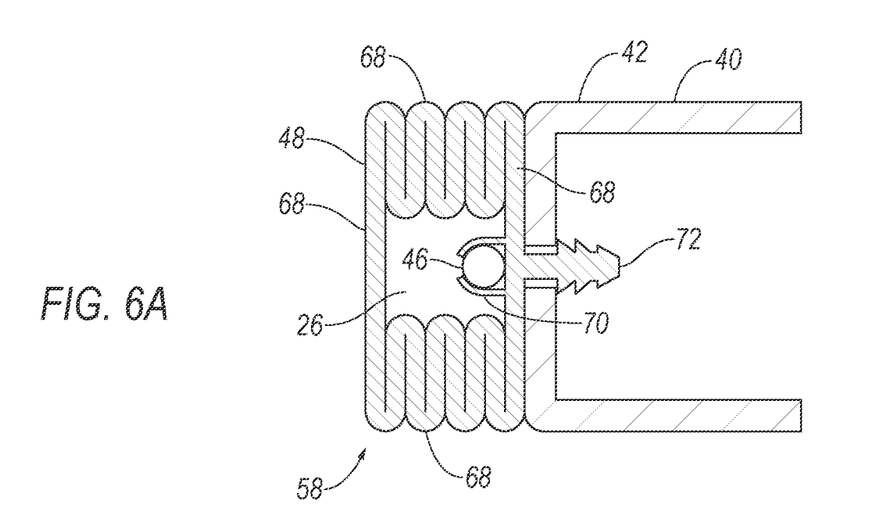
FIG. 6A is a cross-sectional view through line 6 in FIG. 5.

The thermoplastic elastomer (TPE) of the inflatable device 48 is inflatable from the uninflated position to the inflated position. Specifically, the inflatable device 48 has walls 68 that are thermoplastic elastomer. The walls 68 of the inflatable device 48 define the inflation chamber 26 of the inflatable device 48. The inflation chamber 26 is supplied with inflation medium from the inflator 46 to inflate the inflatable device 48 and deploy the inflatable device 48 from the uninflated position to the inflated position. Specifically, the walls 68 of the inflatable devices 48 are solid, i.e., not woven, fabric, sewn, etc. The wall thickness of the inflatable device 48 may be, for example, 1-3 mm. As shown in FIG. 6A, in the uninflated position, one or more of the walls 68 of the inflatable device 48 may be flat and one or more of the walls 68 may be folded. The walls 68 that are folded unfold to allow the inflatable device 48 to expand from the uninflated position to the inflated position. The folded wall 68 may be accordion-shaped in the uninflated position. The wall thickness of the walls 68 of the inflatable device 48 may remain generally constant from the uninflated position to the inflated position, e.g., with little or no stretch.

The inflatable device 48 may be of any suitable TPE, e.g., styrenic block copolymers, thermoplastic olefins, elastomeric alloys, thermoplastic polyurethanes, thermoplastic copolyesters, and thermoplastic polyamides. The inflatable devices 48 may be formed using any suitable manufacturing process, e.g., injection molding, blow molding, ultrasonic welding, etc. Specifically, the walls 68 of the inflatable devices 48 may be unitary with each other, i.e., a single, uniform piece of material with no seams, joints, fasteners, or adhesives holding the walls 68 together, i.e., formed together simultaneously as a single continuous unit. In other examples, the walls 68 of the inflatable device 48 may be non-unitary components, i.e., formed separately and subsequently assembled, e.g., by, welding, adhesive, etc.

The TPE of the inflatable device 48 may be formed with a class-A surface, e.g., the TPE may be textured in a molding process to match another class-A surface of the seat. In such examples, the inflatable devices 48 may be integrated into the seat without an additional covering 44, e.g., without being covered by the covering 44 of the seat.

As set forth above, the vehicle 10 includes at least one inflator 46 that inflates the inflatable devices 48. The inflator 46 is fluidly connected to the respective inflatable device(s) 48. The inflator 46 expands the inflatable device 48 with inflation medium, such as a gas, to move the inflatable device 48 from the uninflated position to the inflated position. The inflator 46 may be, for example, a pyrotechnic inflator 46 that ignites a chemical reaction to generate the inflation medium, a stored gas inflator 46 that releases e.g., by a pyrotechnic valve stored gas as the inflation medium, or a hybrid.

The inflator 46 may be supported by any suitable component. In the example shown in the Figures, the inflator 46 of each inflatable assembly 58 is disposed in the inflation chamber 26 of the respective inflatable device 48. In such examples, the inflatable device 48 may include a clip 70 that engages the inflators 46. The clip 70 may be, for example, unitary with one of the walls 68 of the inflatable device 48, i.e., simultaneously formed together as a unit. In other examples, the inflator 46 may be exterior to the inflation chamber 26 and connected to the inflation chamber 26 with a fill tube. In such examples, the inflator 46 may be fixed to the seatback frame 42.

Figure 6B:
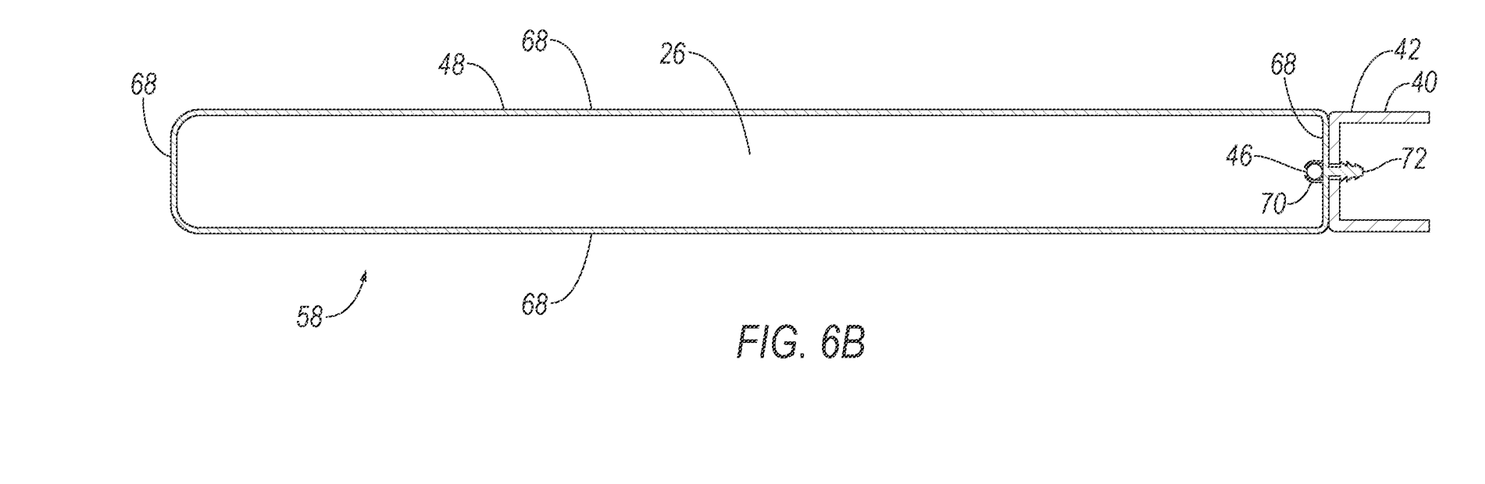
FIG. 6B is the view of FIG. 6A with the inflatable device in the inflated position.

The inflatable device 48 is fixed to the seatback frame 42. In other words, the inflatable device 48 is anchored to the seatback frame 42 and is immoveable relative to the seatback frame 42 at the anchored point. The inflatable device s48 may be secured to the seatback frame 42 in any suitable manner such that the inflatable device 48 remains stationary at the anchored point in the event of an impact to the vehicle 10 and as the inflatable devices 48 move to the inflated positions. As an example, the inflatable device 48 may include one or more fasteners 72 that engage the inflatable device 48 with the seatback frame 42. The fasteners 72 may be unitary with one of the walls 68 of the inflatable devices 48, i.e., a single, uniform piece of material with no seams, joints, fasteners, or adhesives holding them together. As shown in FIGS. 6A-B, the fasteners 72 may be Christmas tree fasteners engageable with holes in the seatback frame 42. In other examples, the inflatable device 48 may be fixed to the seatback frame 42 with any suitable type of fastener to engage the inflatable devices 48 with the seatback frame 42, e.g., clips, fasteners, etc. In some examples, in addition to or in the alternative to the fasteners 72, the inflatable device 48 may be adhered to the seatback frame 42. Any combination of fasteners 72 and adhesive may be used to secure the inflatable device 48 to the seatback frame 42.

In the inflated position, the inflatable device 48 extends through the seatback 14, e.g., through the tear seam in the cover adjacent to the inflatable device 48. In the inflated position, the inflatable device 48 extends from the seatback 14 in the seat-forward direction, i.e., vehicle-forward in the Figures, along the respective occupant-seating area(s) 18. The inflatable device 48 in the inflated position extends may extend more than half the distance of the seat bottom 16 from the seatback 14 to a vehicle-forward end of the seat bottom 16. In some examples, the inflatable device 48 may extend from the seatback 14 to the vehicle-forward end of the seat bottom 16, as shown in the examples in the Figures. In the inflated position, the inflatable device 48 may abut the seat bottom 16, as shown in the examples in the Figures. In such examples, the inflatable device 48 may extend upward from the seat bottom 16 more than half the height of the seatback 14. In some examples, the inflatable device 48 in the inflated position may extend from the seat bottom 16 to a top end of the seatback 14, as shown in the example in the Figures.

Figure 7:
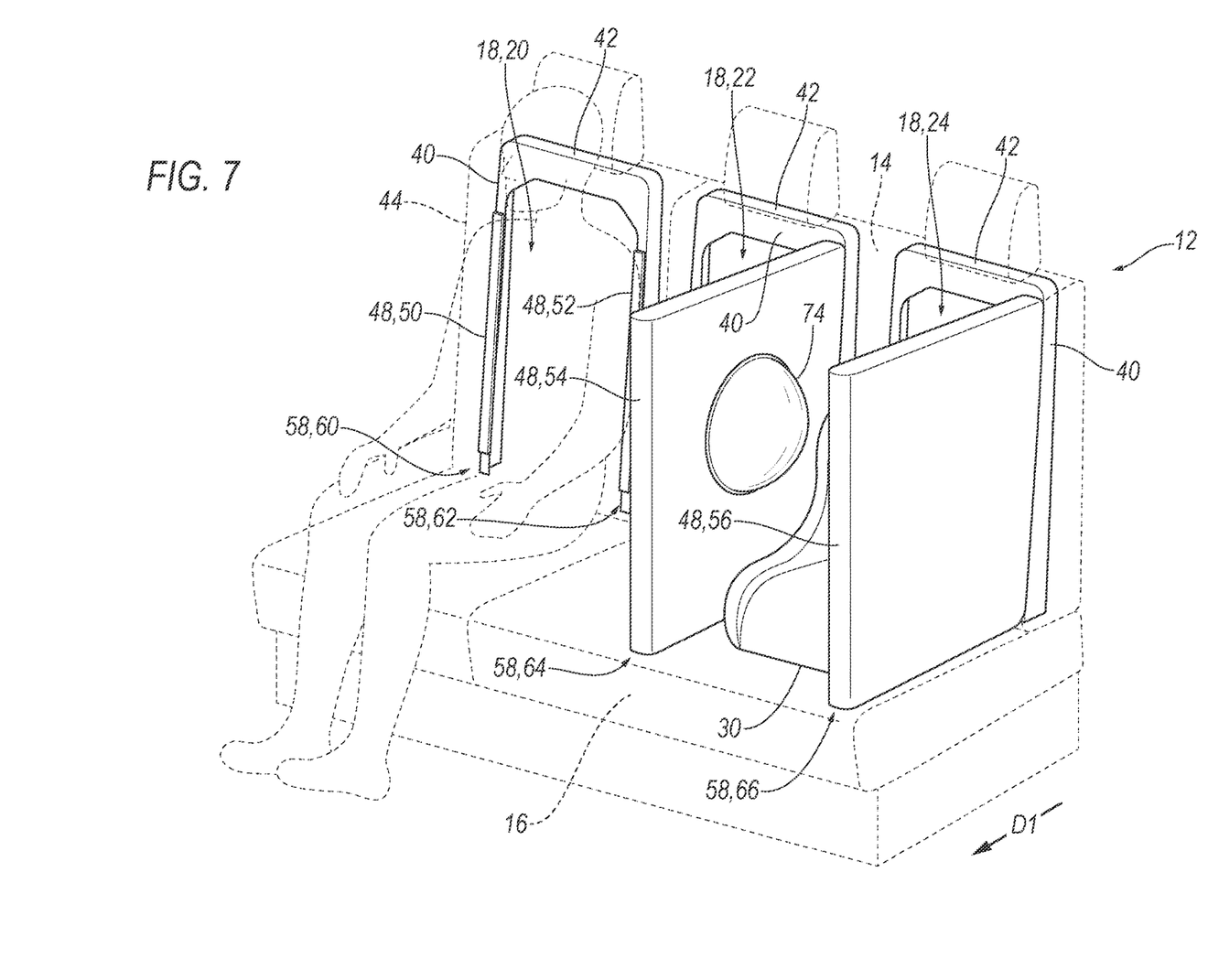
FIG. 7 is a perspective view of the seat with an occupant seated directly on the seat and with a CRS installed on the seat with another example of inflatable devices, two of which are in the inflated position and two of which are in the uninflated position.
Figure 8:
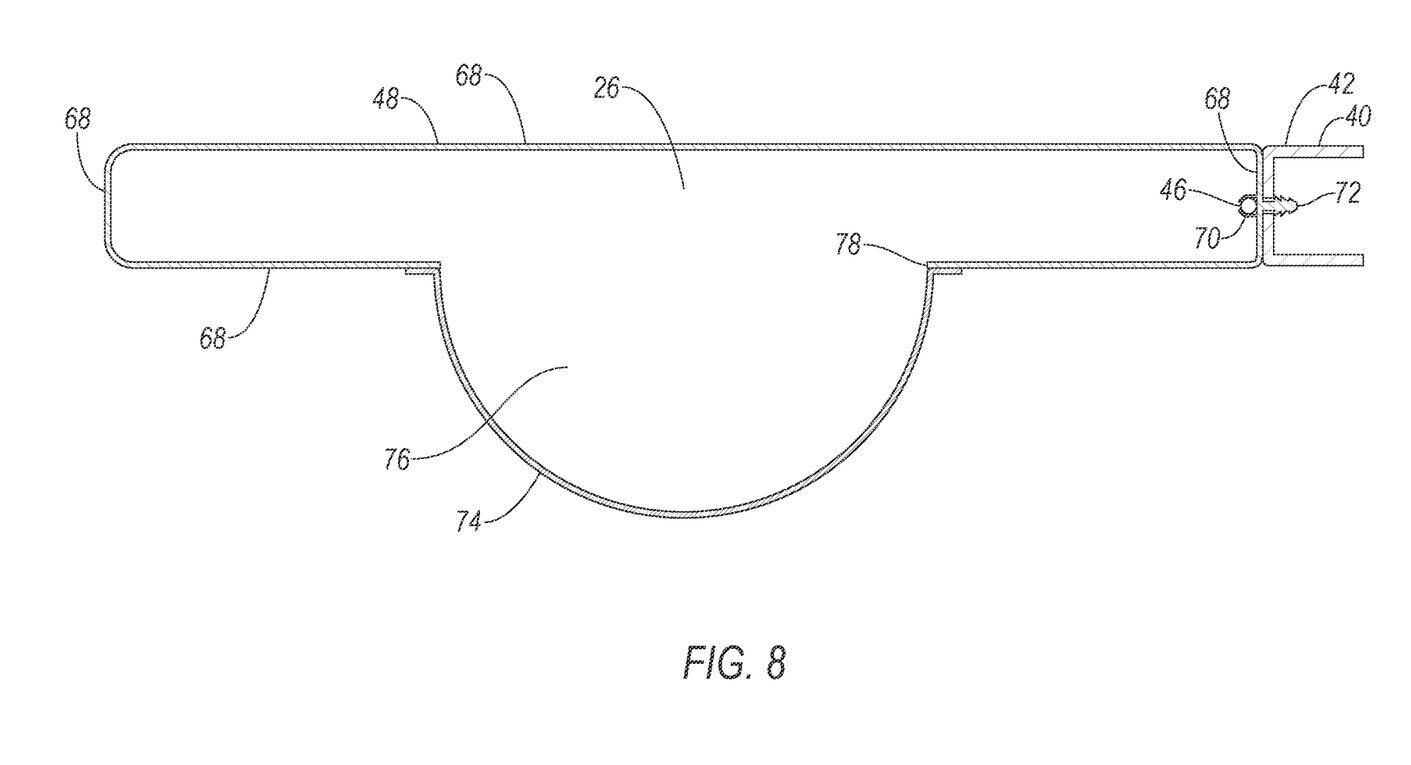
FIG. 8 is a cross-sectional view of a portion of the seat and the inflatable of the example shown in FIG. 7.

With reference to FIGS. 7 and 8, the inflatable assembly 58 may include an airbag 74 supported on the inflatable device 48. The airbag 74 inflates from the uninflated position to the with the inflatable device 48. The airbag 74 is moveable with the inflatable device 48 as the inflatable device 48 inflates from the uninflated position to the inflated position.

The airbag 74 is shown on the third inflatable device 48, 50 in FIG. 7 and it should be appreciated that the airbag 74 may be on each of the inflatable devices 48. Specifically, the first inflatable assembly 58 may have one airbag 74 protruding from the first inflatable device 50 toward the first occupant-seating area 20 and the fourth inflatable assembly 66 may have one airbag 74 protruding from the fourth inflatable device 56 toward the third occupant-seating area 24. One or more of the inflatable assemblies 58 may include more than one airbag 74. For example, in the example shown in the Figures, the second inflatable assembly 62 may include one airbag 74 protruding toward the first occupant-seating area 20 and one airbag 74 protruding toward the second occupant-seating area 20 and the third inflatable assembly 64 may include one airbag 74 protruding toward the second occupant-seating area 20 and one airbag 74 protruding toward the third occupant-seating area 20.

With reference to FIG. 8, the airbag 74 includes an inflation chamber 76 open to the inflation chamber 26 of the inflatable device 48. In the example shown in FIGS. 7 and 8, the inflatable device 48 has an opening 78 and the airbag 74 is connected to the inflatable device 48 around the perimeter of the opening 78. In other examples, a vent may be between the inflation chamber 26 of the inflatable device 48 and the inflation chamber 26 of the airbag 74.

The airbag 74 in the inflated position extends from the inflatable device 48 toward the occupant-seating area 18 adjacent the airbag 74. Specifically, the airbag 74 protrudes from the inflatable device 48. The airbag 74 in the example shown in the Figures has a spherical dome shape.

The airbag 74 is spaced from the seatback 14 and the seat bottom 16 in the inflated position in the example shown in the Figures. Specifically, in the example shown in the Figures, the inflatable device 48 abuts the seat bottom 16, as described above, and the airbag 74 is spaced from the seat bottom 16 in the inflated position. The airbag 74 is positioned to control the kinematics of the CRS 30 and/or the occupant of the CRS 30.

The airbag 74 is fixed to the inflatable device 48 at the connection between the airbag 74 and the inflatable device 48. The airbag 74 may be connected to the inflatable device 48 by, for example, adhesive, bonding, welding, and/or stitching or in any other suitable manner.

The airbag 74 is woven fabric, as described further below. The differences between the woven fabric of the airbag 74 and the solid walls 68 of the inflatable device 48 provide shape, positioning, and inflation characteristics of the airbag 74 and the inflatable device 48 to aid in the design of the inflatable assembly 58 to control the kinematics of the CRS 30 and/or the occupant of the CRS 30.

The airbag 74 may be of any suitable airbag material, e.g., from a woven polymer. For example, the airbag 74 may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc. The airbag 74 may be a single continuous unit, e.g., a single piece of fabric. Alternatively, the airbag 74 may include a plurality of segments, i.e., two or more. The segments may be attached to each other in any suitable fashion, e.g., a plurality of panels attached by stitching, ultrasonic welding, etc.

Figure 9:
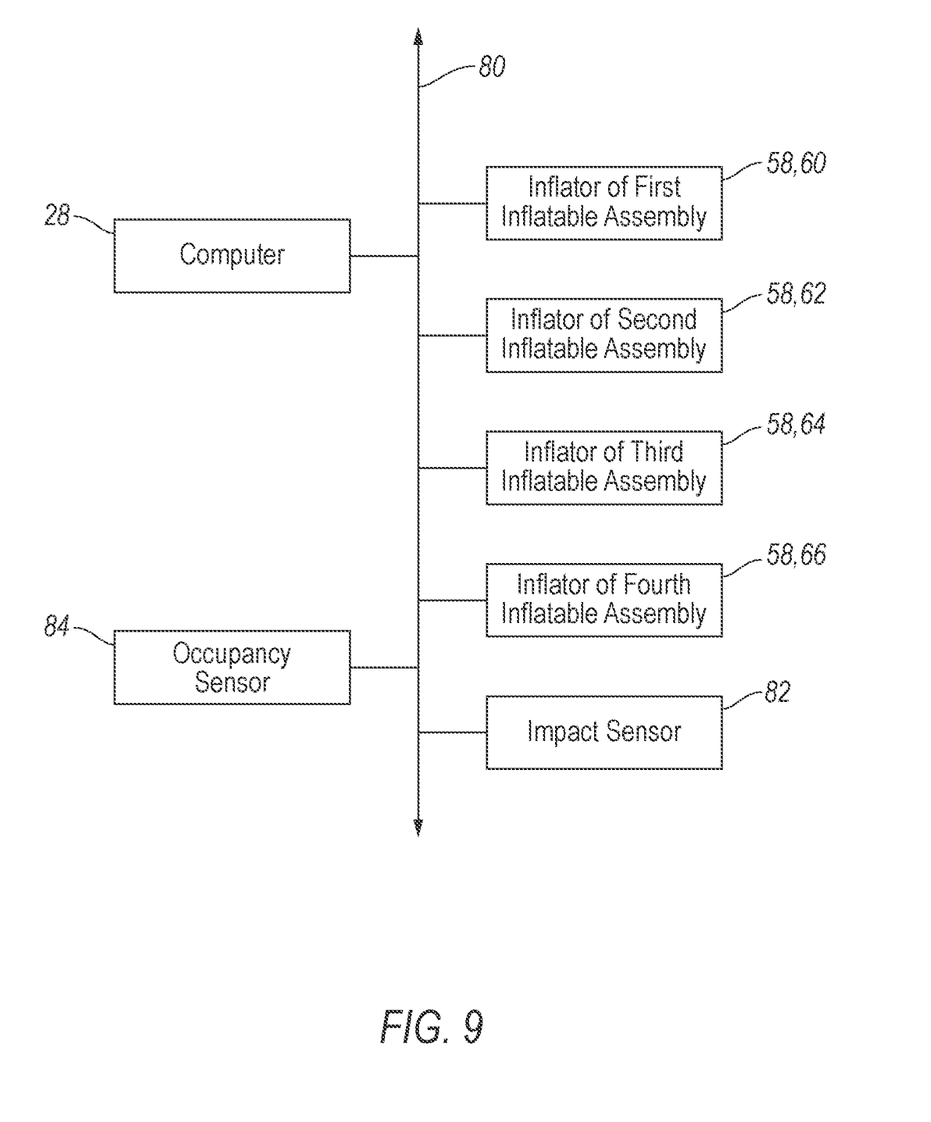
FIG. 9 is a block diagram of a system of the vehicle.

With reference to FIG. 9, the vehicle 10 includes the computer 28. The computer 28 includes a processor and a memory. The computer 28 may be a restraints control module. The memory includes one or more forms of computer 28 readable media, and stores instructions executable by the computer 28 for performing various operations, including as disclosed herein and including, for example, method shown in FIG. 10 and described below. For example, the computer 28 may be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the computer 28 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 28. The memory may be of any type, e.g., hard disk drives, solid state drives, servers, or any volatile or non-volatile media. The memory may store the collected data sent from the sensors. The memory may be a separate device from the computer 28, and the computer 28 may retrieve information stored by the memory via a vehicle communication network 80, e.g., over a CAN bus, a wireless network, etc. Alternatively or additionally, the memory may be part of the computer 28, e.g., as a memory of the computer 28.

As shown in FIG. 9, the computer 28 is generally arranged for communications on the vehicle communication network 80 that may include a bus in the vehicle 10 such as a controller area network CAN or the like, and/or other wired and/or wireless mechanisms. Alternatively or additionally, in cases where the computer 28 includes a plurality of devices, the vehicle communication network 80 may be used for communications between devices represented as the computer 28 in this disclosure. Further, as mentioned below, various controllers and/or sensors may provide data to the computer 28 via the vehicle communication network 80.

The vehicle 10 may include at least one impact sensor 82 for sensing certain vehicle impacts (e.g., impacts of a certain magnitude, direction, etc.) and the computer 28 is in communication with the impact sensor 82 and the inflator 46. The computer 28 may activate the inflator 46, e.g., provide an impulse to a pyrotechnic charge of the inflator 46 when the impact sensor 82 senses certain vehicle impacts. The impact sensor 82 may be configured to sense certain vehicle impacts prior to impact, i.e., pre-impact sensing. The impact sensor 82 may be in communication with the computer 28. The impact sensor 82 is configured to detect certain vehicle impacts. In other words, a "certain vehicle impact" is an impact of the type and/or magnitude for which inflation of the airbag 74 is designed i.e., "certain" indicates the type and/or magnitude of the impact. The type and/or magnitude of such "certain vehicle impacts" may be pre-stored in the computer 28, e.g., a restraints control module and/or a body control module. The impact sensor 82 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 82 may be located at numerous points in or on the vehicle 10.

The vehicle 10 may include at least one occupancy sensor 84. The occupancy sensor 84 configured to detect occupancy of the vehicle seats 12, e.g., detect an occupant in the occupant-seating area 18. Specifically, the occupancy sensor 84 may detect occupancy of the seat by a CRS 30 and/or an occupant seated directly on the seat, e.g., and adult occupant.

The occupancy sensor 84 may be visible-light or infrared cameras directed at the vehicle seat 12, weight sensors supported by the seat bottom 16, sensors detecting whether a seatbelt assembly for the seat is buckled, or other suitable sensors. The occupancy sensor 84 provides data to the computer 28 specifying whether the vehicle seat 12 is occupied or unoccupied and information regarding the type of occupant.

As one example, the vehicle 10 may include one occupancy sensor 84 for each occupant-seating area 18. As another example, the vehicle 10 may include one occupancy sensor 84 that is designed to individually detect occupancy of each occupant-seating area 18.

The occupancy sensor 84 is designed to detect data identifying the type of occupancy. e.g., a CRS 30 on the occupant-seating area 18, an adult occupant directly seated on the occupant-seating area 18, etc. In some examples, the occupancy sensor 84 may determine the type of occupant, a CRS 30 on the occupant-seating area 18, an adult occupant directly seated on the occupant-seating area 18, etc. In other examples, the occupancy sensor 84 may communicate data to the computer 28 for use by the computer 28 to identify the type of occupant.

Figure 10:
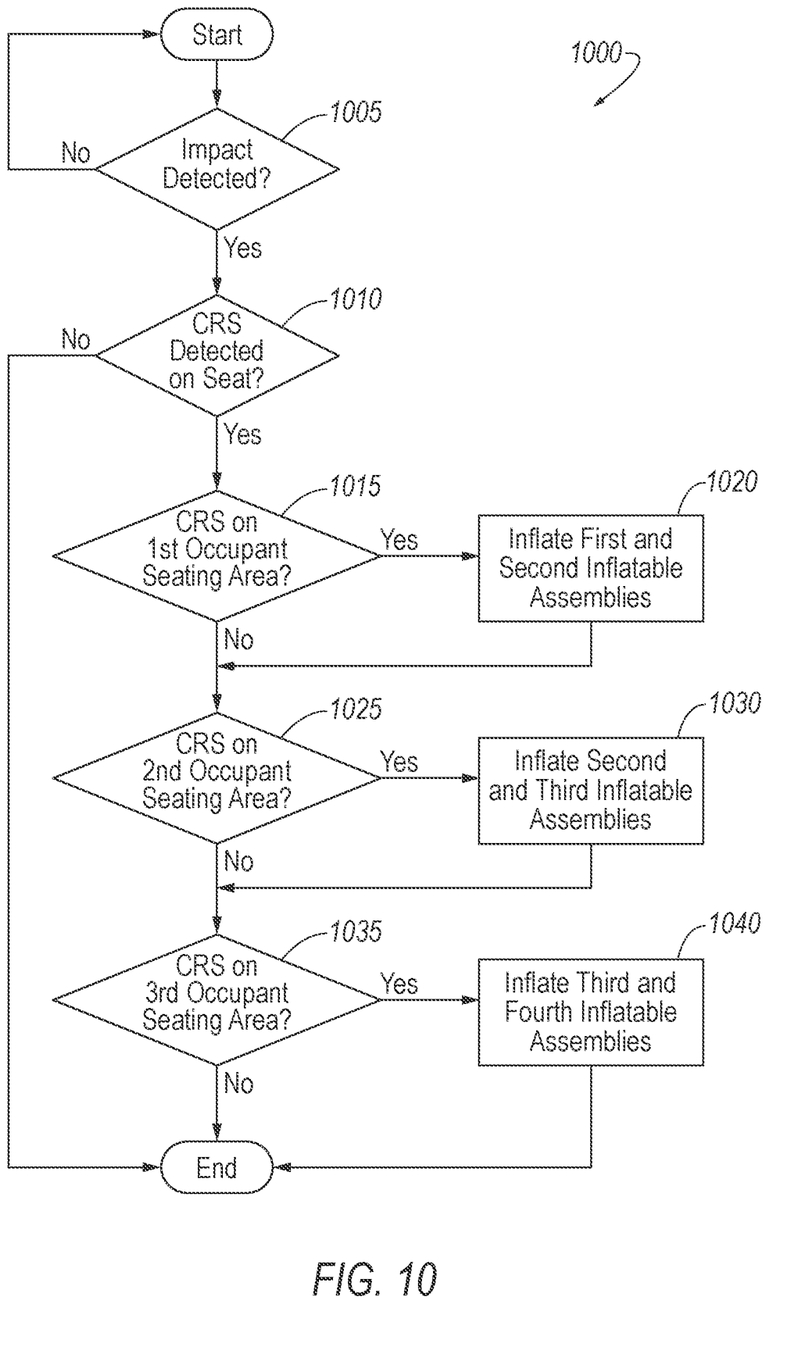
FIG. 10 is a flow chart of an example process.

With reference to FIG. 10, the computer 28 stores instructions to control components of the vehicle 10 according to the method 1000 shown in FIG. 10. Use of "in response to," "based on," and "upon determining" herein indicates a causal relationship, not merely a temporal relationship.

In the method 1000, the computer 28 selectively deploys the first inflatable assembly 58, 60, the second inflatable assembly 58, 62, the third inflatable assembly 58, 64, and the fourth inflatable assembly 58, 66 based on detection of a CRS 30 in the first occupant-seating area 18, 20, the second occupant-seating area 18, 22, and/or the third occupant-seating area 18, 24. Specifically, the example method 1000, the computer 28 deploys the inflatable assemblies 58 adjacent a respective occupant-seating area 18 on opposing sides of that occupant-seating area 18 when a CRS 30 is detected on that occupant-seating area 18 when certain vehicle impacts are detected. In other examples, the computer 28 may deploy one of the inflatable assemblies 58 adjacent a respective occupant-seating area 18 when a CRS 30 is detected on that occupant-seating area 18 when certain vehicle impacts are detected.

In block 1005, the method 1000 includes detecting certain vehicle impacts. Specifically, the impact sensor 82, as described above, may detect certain vehicle impacts. In such an example, the impact sensor 82 communicates the detection of certain vehicle impacts to the computer 28, e.g., by sending a signal over the vehicle communication network 80. In the event a certain vehicle impact is not detected, the method 1000 returns block to start. In the event an occupant is detected, the method 1000 proceeds to block 1010.

With reference to block 1010 of FIG. 10, the method 1000 includes detecting an occupant in the occupant-seating area 18. Specifically, the occupancy sensor 84, as described above, may detect occupancy of the occupant-seating areas 18 by a CRS 30 and/or another occupant. In such an example, the occupancy sensor 84 communicates the detection of the occupant and information regarding the type of occupant to the computer 28, e.g., by sending a signal over the vehicle 10 communication network. In the event no occupant is detected, the method returns to start. In the event an occupant is detected, the method 1000 proceeds as described below.

Specifically, with reference to block 1015, the method 1000 ends in response to detection of certain vehicle impacts and no detection of a CRS 30 on any of the occupant-seating areas 18. In other words, none of the inflatable assemblies are inflated in the event no CRS 30 is detected. For example, if an adult occupant seated directly on the occupant-seating area 18 is detected, and no CRS 30 on any of the occupant-seating areas 18 is detected, then none of the inflatable assemblies are inflated and the method 1000 ends. In other words, in the event that an adult occupant is detected on one of the occupant-seating areas 18, the method 1000 maintains the inflatable assembly 58 on either cross-vehicle side of the adult in an uninflated position unless otherwise inflated based on detection of a CRS 30 on an adjacent occupant-seating area 18. Said differently, if only an adult occupant is detected on one of the occupant-seating areas 18, and no CRS 30 is detected on any occupant-seating area 18, the method 1000 maintains the inflatable assemblies on either cross-vehicle side of the adult in an uninflated position.

With reference to blocks 1015-1040, the method 1000 includes selectively deploying the inflatable assemblies 58 based on occupancy of the occupant-seating areas 18 and detection of certain vehicle impacts. The inflatable assemblies may be inflated by commanding the respective inflator 46 of the inflatable assembly 58 to inflate, as described above.

Specifically, with reference to blocks 1015 and 1020, if a CRS 30 is detected on the first occupant-seating area 18, 20, the method 1000 includes deploying the first inflatable assembly 58, 60 and the second airbag 74 assembly in response to the detection of the CRS 30 on the first occupant-seating area 18, 20 and detection of certain vehicle impacts. With reference to blocks 1025 and 1030, if a CRS 30 is detected on the second occupant-seating area 18, 22, the method 1000 includes deploying the second airbag 74 assembly and the third airbag 74 assembly in response to the detection of the CRS 30 on the second occupant-seating area 18, 22 and detection of certain vehicle impacts. With reference to blocks 1035 and 1040, if a CRS 30 is detected on the third occupant-seating area 18, 24, the method 1000 includes deploying the third airbag 74 assembly and the fourth airbag 74 assembly in response to the detection of the CRS 30 on the third occupant-seating area 18, 24 and detection of certain vehicle impacts.

In blocks 1015-1040, the method 1000 may include deployment of an airbag 74 adjacent an adult occupant in the event the adult occupant is seated in the occupant-seating area 18 adjacent a CRS 30 and certain vehicle impact is detected. However, in such an example, the detection of the adult occupant does not trigger deployment of the airbag 74 assembly by the computer 28 but instead the airbag 74 assembly between the adult occupant and the CRS 30 is inflated based on detection of the CRS 30 and certain vehicle impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
    a vehicle seat having a seatback and a seat bottom defining an occupant-seating area;
    an inflatable device fixed to the seatback and inflatable from the seatback vehicle-forward along the occupant-seating area from an uninflated position to an inflated position;
    the inflatable device having an inflation chamber, the inflatable device being a thermoplastic elastomer; and
    a computer including a processor and a memory storing instructions executable by the processor to:
        detect a removeable child-restraint system on the occupant-seating area;
        based on the detection of the removeable child-restraint system on the occupant-seating area, inflate the inflatable device in response to detection of certain vehicle impacts; and
        to maintain the inflatable device in an uninflated position based on detection of an adult occupant in the occupant-seating area.

2. The vehicle of claim 1, further comprising:
    a second inflatable device fixed to the seatback and inflatable vehicle-forward along the occupant-seating area from an uninflated position to an inflated position;
    the second inflatable device having an inflation chamber, the second inflatable device being a thermoplastic elastomer;
    the second inflatable device being spaced from the inflatable device, the occupant-seating area being between the inflatable device and the second inflatable device in the inflated positions; and
    the memory storing instructions executable by the processor to:
    based on detection of the removeable child-restraint system on the occupant-seating area, inflate both the inflatable device and the second inflatable device in response to detection of certain vehicle impacts.

3. The vehicle of claim 2, further comprising:
    the vehicle seat defining a second occupant-seating area;
    a third inflatable device fixed to the seatback and inflatable vehicle-forward along the second occupant-seating area from an uninflated position to an inflated position;
    the third inflatable device having an inflation chamber, the third inflatable device being a thermoplastic elastomer;
    the third inflatable device being spaced from the second inflatable device, the second occupant-seating area being between the second inflatable device and the third inflatable device: and
    the memory storing instructions executable by the processor to:
    based on the detection of the removeable child-restraint system on the second occupant-seating area, inflate the second inflatable device and the third inflatable device in response to detection of certain vehicle impacts.

4. The vehicle of claim 3, further comprising:
    the vehicle seat defining a third occupant-seating area;
    a fourth inflatable device fixed to the seatback and inflatable vehicle-forward along the third occupant-seating area from an uninflated position to an inflated position;
    the fourth inflatable device having an inflation chamber, the fourth inflatable device being a thermoplastic elastomer;
    the fourth inflatable device being spaced from the third inflatable device, the third occupant-seating area being between the third inflatable device and the fourth inflatable device: and
    the memory storing instructions executable by the processor to:

based on the detection of the removeable child-restraint system on the third occupant-seating area, inflate the third inflatable device and the fourth inflatable device in response to detection of certain vehicle impacts.

5. The vehicle of claim 1, further comprising an airbag supported on the inflatable device and inflating from the uninflated position to the inflated position with the inflatable device.

6. The vehicle of claim 5, wherein the airbag is moveable with the inflatable device as the inflatable device inflates from the uninflated position to the inflated position.

7. The vehicle of claim 5, wherein the airbag extends from the inflatable device toward the occupant-seating area in the inflated position.

8. The vehicle of claim 5, wherein the airbag includes an inflation chamber open to the inflation chamber of the inflatable device.

9. The vehicle of claim 5, wherein the airbag is spaced from the seatback in the inflated position.

10. The vehicle of claim 9, wherein the inflatable device abuts the seat bottom in the inflated position and the airbag is spaced from the seat bottom in the inflated position.

11. The vehicle of claim 5, wherein the airbag is woven fabric.

12. The vehicle of claim 1, further comprising an inflator in fluid communication with the inflatable device.

13. The vehicle of claim 1, wherein the inflatable device abuts the seat bottom in the inflated position.

14. The vehicle of claim 1, wherein the seatback has a seatback frame and a covering on the seatback frame, the inflatable device being between the seatback frame and the covering in the uninflated position and extending through the covering in the inflated position.

* * * * *